UNITED STATES PATENT OFFICE.

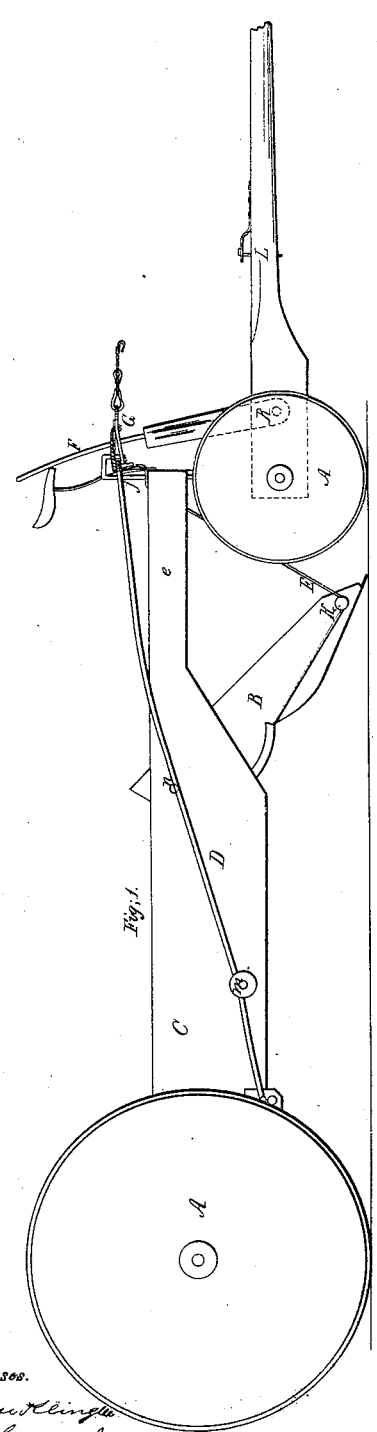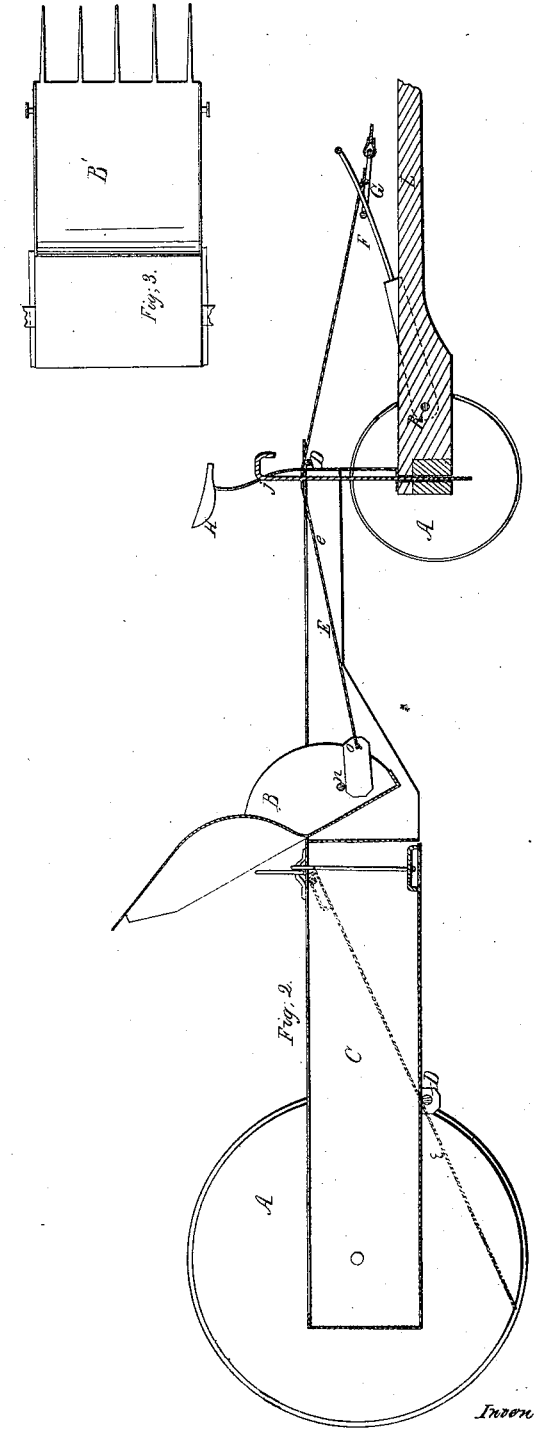

DANIEL McNABB, OF MOSCOW, MICHIGAN.

IMPROVEMENT IN EXCAVATORS.

Specification forming part of Letters Patent No. 40,850, dated December 8, 1863.

*To all whom it may concern:*

Be it known that I, DANIEL MCNABB, of Moscow, in the county of Hillsdale, in the State of Michigan, have invented a new and Improved Excavator or Self-Loading Wagon; and I do hereby declare that the following is a full and exact description thereof, reference being had to the accompanying drawings, and to the letters of reference marked thereon.

The nature of my invention consists in so adjusting a scraper, shovel, a fork, or rake of peculiar construction, between the forward and rear wheels of a wagon by chains and otherwise that when the horses or team moves forward the scraper is filled, the draft or power being applied directly to the wagon. When the scraper is filled, the wheels of the wagon are stopped by a brake, which is operated by the driver or attendant, when the draft is changed from the wagon to the scraper in such a manner that the front end of the scraper is raised by the continued movement of the team, and its position is reversed and its contents discharged into the wagon-box. The team is then backed a step or so, the power is again attached or transferred to the wagon, the scraper drops down to its position on the ground, and the operation is repeated.

To enable others skilled in the art to make and use my invention, I will now proceed to describe its construction and operation.

Figure 1 is a side elevation, showing the position of the scraper when ready to fill. Fig. 2 is a longitudinal section through the middle. Fig. 3 is a detached view of the scraper, with forks, which may be used instead of the scraper for loading stone or manure.

I construct my machine much in the form of a common wagon, A A A A being the four wheels, and C the box, as seen in the drawings; but the sides of the box are elongated or extended forward to the axle of the forward wheels, and resting thereon, while the bottom of the box only reaches about half the distance between the rear and forward wheels, thus giving room for the scraper, shovel, fork, or rake to be operated in front of the box and behind the forward wheels. The scraper B is hung on pivots n n, between the elongated portion of the sides of the wagon box. E E are chains attached to the scraper, as seen at O, Fig. 2, and to a bar, G, at each end. The draft-whiffletrees are attached to this bar G, which is much in the form of the common double whiffletree, only the double whiffletree is attached to its center by a staple, while another staple on the back side of it serves to attach it to the wagon. These two chains—one on each side of the scraper and attached to each end of the bar G—bear upon the under side of the scraper and rest in grooves P when raising the scraper, shovel, fork, or rake. This portion of the scraper, shovel, fork, or rake projects the width of the groove, and is that much wider than the lower portion to allow the chains to run along the side and around the pulleys K, and from thence forward to the bar G.

D is a brake to act upon the wheels to stop the motion of the wagon as soon as the scraper, shovel, fork, or rake is loaded. This brake is operated by the driver with his foot, and the same operation throws the staple-bar G from the hook *j*, thus liberating it from the wagon and bringing the power upon the scraper through the chains E E. It will be seen that, as the wagon stops and the power is thrown upon the scraper, (the team still moving forward,) the chains will continue to raise the forward end of the scraper, lifting it at the point K until they draw upon the back portion of it or from the point *o*, thus reversing its position, as seen in Fig. 2, and discharging its contents into the wagon-box.

M is a fulcrum for the brake D, which acts as a lever upon the rear wheels. It is in the form of a long bale, extending along each side of the wagon and running across the front under the feet of the driver with holes or eyes at *m*. When the front end is depressed, the back ends act as a brake upon the rear wheels. The front end is also pressed at the same time upon the top of the forward wheels.

F is a shifter, turning on a pivot at R. It supports the bar G and the whiffletrees. When the power is applied to the wagon, this shifter stands as seen in Fig. 1. The bar G is attached to the wagon by the hooked bolt *j*, which is the king-bolt, pressing down through the axle-tree. When the power is applied to the scraper, the brake D is pressed down by the foot of the driver, which presses upon the staple of the bar G, detaching it from the hook *j*, when the shifter F is drawn forward, with the bar G and the whiffletrees, and may rest on the tongue or pole L.

H is the driver's seat.

The bottom of the wagon-box is made, if desired, to turn on pivots and to dump the load. It may be operated in any of the well-known methods in use.

B', Fig. 3, is a detached view of the scraper, with the forks designed for handling manure or other substances.

Having thus described my invention, what I claim as new, and desire to secure by Letters Patent, is—

1. The combination scraper B, with its grooves P and pulley K, suspended by chains E E on pivots n, and operating substantially as described.

2. The bar G, the hooked king-bolt j, the shifter F, and the brake D, the whole constructed, combined, and operating substantially as described, and for the purposes specified.

DANIEL McNABB.

Witnesses:
N. CALLAN,
J. PEIRCE KLINGLE.